(12) United States Patent
Solodovnikov et al.

(10) Patent No.: US 10,313,324 B2
(45) Date of Patent: Jun. 4, 2019

(54) SYSTEM AND METHOD FOR ANTIVIRUS CHECKING OF FILES BASED ON LEVEL OF TRUST OF THEIR DIGITAL CERTIFICATES

(71) Applicant: Kaspersky Lab ZAO, Moscow (RU)

(72) Inventors: Andrey Y. Solodovnikov, Moscow (RU); Andrey V. Ladikov, Moscow (RU); Michael Pavlushik, Moscow (RU)

(73) Assignee: AO Kaspersky Lab, Moscow (RU)

( * ) Notice: Subject to any disclaimer, the term of this patent is extended or adjusted under 35 U.S.C. 154(b) by 400 days.

(21) Appl. No.: 14/557,922

(22) Filed: Dec. 2, 2014

(65) Prior Publication Data
US 2016/0359842 A1 Dec. 8, 2016

(51) Int. Cl.
*H04L 9/32* (2006.01)
*H04L 29/06* (2006.01)
*G06F 21/56* (2013.01)

(52) U.S. Cl.
CPC .......... *H04L 63/0823* (2013.01); *G06F 21/56* (2013.01); *G06F 21/565* (2013.01); *H04L 9/3247* (2013.01)

(58) Field of Classification Search
CPC ...... G06F 21/335; G06F 21/56; G06F 21/565; G06F 2221/2111; G06F 2221/2153; H04L 41/12; H04L 41/5064; H04L 43/0876; H04L 63/0823; H04L 63/102;
(Continued)

(56) References Cited

U.S. PATENT DOCUMENTS 6,976,271 B1 12/2005 Le Pennec et al.
7,392,544 B1 * 6/2008 Pavlyushchik ....... G06F 21/562
713/187
8,401,982 B1 3/2013 Satish et al.
(Continued)

FOREIGN PATENT DOCUMENTS

CN  101399666 A  4/2009
GB  2495648 A  4/2013
(Continued)

OTHER PUBLICATIONS

Combining Classifiers with Meta Decision Trees; Machine Learning, 50, 223-249, 2003 © 2003 Kluwer Academic Publishers. Manufactured in The Netherlands.
(Continued)

*Primary Examiner* — Joseph P Hirl
*Assistant Examiner* — Sayed Aresh Beheshti Shirazi
(74) *Attorney, Agent, or Firm* — Arent Fox LLP; Michael Fainberg

(57) ABSTRACT

Disclosed are systems, methods and computer program products for antivirus checking of files based on level of trust of their digital certificates. An example method includes obtaining a digital certificate of a digital signature of a file; determining validity of the obtained digital certificate; assigning a level of trust to the digital certificate based on the determined validity or invalidity of the digital certificate of the file; based on the assigned level of trust of the digital certificate of the file, determining what antivirus checking method to perform on the file; and performing the determined antivirus checking method on the file.

20 Claims, 6 Drawing Sheets

(58) Field of Classification Search
CPC ....... H04L 63/105; H04L 67/02; H04L 67/18; H04L 67/22; H04L 9/3247
See application file for complete search history.

(56) References Cited

U.S. PATENT DOCUMENTS

| | | | |
|---|---|---|---|
| 8,499,150 B1* | 7/2013 | Nachenberg | H04L 9/3268 713/156 |
| 8,561,193 B1 | 10/2013 | Srivastava et al. | |
| 9,407,644 B1* | 8/2016 | Cheng | H04L 63/1408 |
| 2007/0260738 A1* | 11/2007 | Palekar | G06F 21/577 709/229 |
| 2007/0288689 A1 | 12/2007 | Lu et al. | |
| 2010/0115269 A1 | 5/2010 | Allen et al. | |
| 2012/0084859 A1 | 4/2012 | Radinsky et al. | |
| 2012/0144190 A1* | 6/2012 | Braun | G06F 21/602 713/156 |
| 2013/0145153 A1* | 6/2013 | Brown | G06F 21/6263 713/156 |
| 2013/0198065 A1* | 8/2013 | McPherson | H04L 61/1511 705/40 |
| 2014/0123285 A1* | 5/2014 | Ludwig | G06F 21/55 726/23 |
| 2014/0283054 A1* | 9/2014 | Janjua | H04L 63/1408 726/23 |
| 2016/0373433 A1* | 12/2016 | Rivers | H04L 63/0823 |

FOREIGN PATENT DOCUMENTS

| | | |
|---|---|---|
| RU | 2008118893 A | 11/2009 |
| WO | 2004021638 A1 | 3/2004 |
| WO | 2010033328 A2 | 3/2010 |

OTHER PUBLICATIONS

Detection of malicious code by applying machine learning classifiers on static features: A state-of-the-art survey; Asaf Shabtai, Robert Moskovitch, Yuval Elovici, Chanan Glezer Deutsche Telekom Laboratories at Ben-Gurion University, Be'er Sheva 84105, Israel; Information Security Technical Report 14 (2009) 16-29.

Chinese Office Action from corresponding Chinese Application dated Feb. 12, 2018.

\* cited by examiner

SYSTEM AND METHOD FOR ANTIVIRUS CHECKING OF FILES BASED ON LEVEL OF TRUST OF THEIR DIGITAL CERTIFICATES

FIELD OF TECHNOLOGY

The disclosure relates generally to the field of computer security and in particular to antivirus checking of files based on level of trust of their digital certificates.

BACKGROUND

The popularity of computer and network technologies has been rapidly growing for the past two decades; however, it has been accompanied by a steady growth in cybercrime, which ranges from relatively harmless cases, such as distribution of unsolicited e-mail, commonly known as spam, to more serious cases of cybercrimes, such as denial of service attacks, stealing of confidential financial information, and even cyber warfare and terrorism. It has become obvious that it is imperative to aggressively combat cybercrime. And, one of the most commonly used means for protecting computers from cyber attacks is antivirus software. However, current generation of antivirus software solutions has shortcomings.

Typical antivirus applications can perform several different malware detection methods, generally ranging from relatively quick signature matching to more complex heuristic analysis and emulation. The latter antivirus checking methods are generally resource intensive, which has detrimental effect on the productivity of computers on which they are run, especially during performance of frequent and complex antiviral tasks. Examples of such tasks are checking hard disk for malware, which significantly loads computer's disk system. The consumption of processing resources by antivirus application especially affects personal computers, notebooks and other types of computers that have limited processing capabilities.

Accordingly, there is a need to improve efficiency of operation of antivirus software.

SUMMARY

Disclosed are systems, methods and computer program products for antivirus checking of files based on level of trust of their digital certificates. In one aspect, an example method for performing antivirus checking of a file comprises: obtaining a digital certificate of a digital signature of the file; determining, by a hardware processor, validity of the obtained digital certificate; assigning a level of trust to the digital certificate based on the determined validity or invalidity of the digital certificate of the file; based on the assigned level of trust of the digital certificate of the file, determining what antivirus checking method to perform on the file; and performing the determined antivirus checking method on the file.

In one example aspect, the method may further comprise: assigning a low level of trust to an invalid digital certificate or digital certificate of a known malicious file; and performing one or more of heuristic analysis, emulation, manual checking and blocking of execution of the file having a digital certificated with a low level of trust.

In one example aspect, the method may further comprise: assigning a medium level of trust to valid digital certificate; and performing signature matching of the file having a digital certificated with a medium level of trust.

In one example aspect, the method may further comprise: assigning a high level of trust to digital certificates issued by a trusted certification authority; and not performing antivirus checking of a file having a digital certificate with a high level of trust.

In one example aspect, determining validity of the digital certificate may includes: constructing a certificate chain associated with the certificate of the file; and traversing the certificate chain and validating each certificate in the chain.

In one example aspect, the method may further comprise assigning a low level of trust to an intermediate certificate in the certificate chain that were found in the certificate chains of a malicious file.

In one example aspect determining whether a digital certificate is valid when one or more of the following conditions is met: the digital signature of the certification authority is correct; the validity period of the certificate has not expired at the present moment; and the certificate has not been revoked.

In another aspect, an example system for performing antivirus checking of a file, the system comprising: a hardware processor configured to obtain a digital certificate of a digital signature of the file; determine validity of the obtained digital certificate of the file; assign a level of trust to the digital certificate based on the determined validity or invalidity of the digital certificate of the file; based on the assigned level of trust of the digital certificate of the file, determine what antivirus checking method to perform on the file; and perform the determined antivirus checking method on the file.

In another aspect, an example computer program product, stored on a non-transitory computer readable medium, includes computer executable instructions for performing antivirus checking of a file, including instructions for: obtaining a digital certificate of a digital signature of the file; determining, by a hardware processor, validity of the obtained digital certificate; assigning a level of trust to the digital certificate based on the determined validity or invalidity of the digital certificate of the file; based on the assigned level of trust of the digital certificate of the file, determining what antivirus checking method to perform on the file; and performing the determined antivirus checking method on the file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for antivirus checking of files based on level of trust of their digital certificates. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
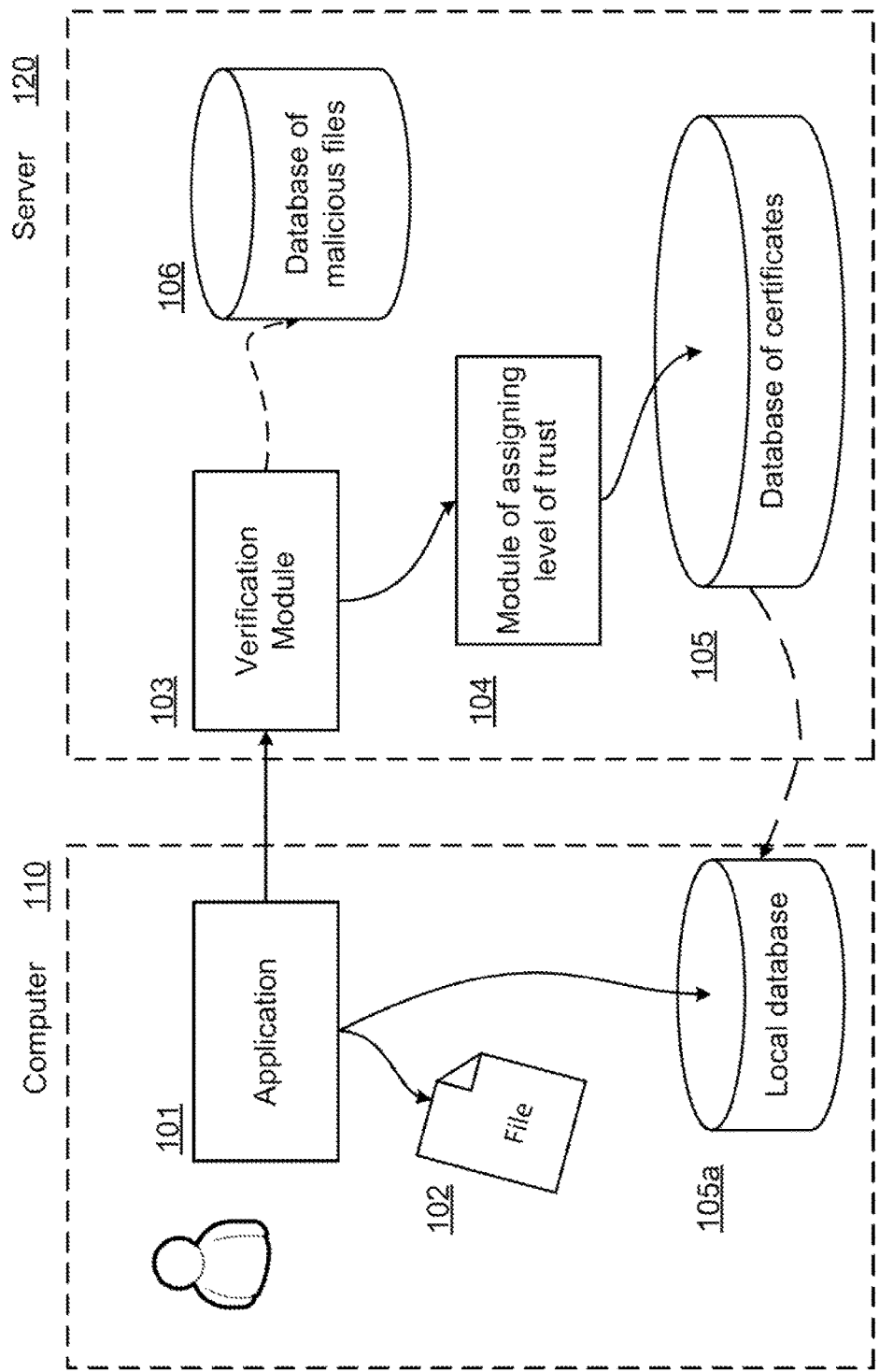
FIG. 1 shows an example system for antivirus checking of files based on level of trust of their digital certificates according to one example aspect.

FIG. 1 shows a general diagram of an example system for antivirus checking of files based on level of trust of their digital certificates according to one aspect. The term digital certificate also commonly referred to as a public key certificate or an identify certificate. The system 100 includes a user computer 110 with installed application 101. The computer 110 can be, for example, a personal computer (PC), a notebook, a tablet, a smartphone, or other type of computing device. In one example aspect, the application 101 may be an antivirus program configured to perform antivirus checking of files 102 stored or downloaded on the computer 110 using, for example, signature matching, emulation, heuristic analysis and other known malware detection techniques. In one example aspect, the antivirus application 101 may also check the validity of the public key certificate of the files' digital signatures. The certificate may be deemed valid if one or more of the following conditions are met:
 the digital signature of the certification authority (CA)s correct;
 the validity period of the certificate has not expired at the present moment; and
 the certificate has not been revoked.

In one example aspect, the system 100 may also include a server 120, which is connected via a private or public network to the user computer 110. The server 120 includes a verification module 103, connected to the application 101, and designed to obtain an end certificate from the application 101 upon performing a verification of the certificate. The end certificate may be the public key certificate of the software manufacturer whose digital signature was used to sign the file 102. A module of assigning a level of trust 104 is connected to the verification module 103 and serves to determine the level of trust for certificates with the help of a database of trusted certificates 105. The level of trust as used herein refers to a parameter (such as an integer) determining the validity of the certificate, and it is used for the antivirus checking of file 102. The database 105 is connected to the module of assigning the level of trust 104, and it contains certificates, as well as their corresponding levels of trust and identifiers which can be used to uniquely determine each certificate. The certificate identifier can be, for example, a serial number, a public key, a thumbprint (the hash sum from the public key of the certificate), the issuer and subject names, and so on.

In one example aspect, the user computer 110 may also includes a local database of trusted certificates 105a, which is connected the server database 105. The local database 105a may contain a complete or partial list of certificates with corresponding levels of trust. The local database 105a may be periodically updated with information from the database 105.

In one example aspect, the module of assigning the level of trust 104 is configured to populate the database 105 with the certificates of files 102 and appropriate levels of trust to the certificates. In one example aspect, the level of trust of a digital certificate can take on the following values: low, medium and high. A low level of trust may indicate that the digital signature of the subject of the certificate is invalid. For example, a low level of trust may be assigned to certificates of the digital signature used to sign malicious files. A list of malicious files and their certificates may be obtained from the database of malicious files 106. Files whose certificates have low level of trust might require additional antivirus checking by the application 101. Additional checking may for example include antivirus analysis using more complex and resource-intensive malware detection techniques, such as emulation and heuristic analysis, as compared to the routine antivirus check using signature matching. In one example aspect, additional checking may include manually analysis of the file by human software experts. A medium level of trust may be assigned to valid certificates whose identifiers have been received from the users. A medium level of trust may indicate that a routine antivirus check by the antivirus application 101, such as signature matching, may be sufficient. A high level of trust may be assigned to certificates whose certification authority is contained on the list of trusted certification authorities. For example, the trusted certification authorities can be the CAs of the largest software producers. In another example, the list of trusted certification authorities can be stored on the server 120. A high level of trust may indicate that the file is safe and no additional antivirus checks are needed on these files.

In one example aspect, the verification module 103 is configured to form the certificate chain from the end certificate to the root certificate. The certificate chain consists of the set of certificates needed to certify the software producer identified by the end certificate. Usually the certificate chain contains an end certificate, a set of intermediate certificates, and a root certificate—the certificate of a root certification authority trusted by all parties in the certificate chain. Each intermediate CA in the chain contains a certificate issued by a certification authority on a higher level in the chain. The root CA issues a certificate for itself. Furthermore, the verification module 103 serves to determine one of:
 a first certificate of the certificate chain that is contained in the database 105;
 an end certificate in the certificate chain.

In one example aspect, the server 120 may also include a database of malicious files 106 that contains, for each known malicious file, its hash sum, the public key certificate of the digital signature and its identifier, the status of the malicious file (for example, virus, root kit, worm, Trojan horse), the initial file, and other type of information that may be used for file identification.

In one example aspect, the application 101 and the file 102 may be located on the user computer 110, while the modules 103-106 may be located on the server 120. In another example aspect, the database 105 can be located on the user computer 110.

Figure 2:
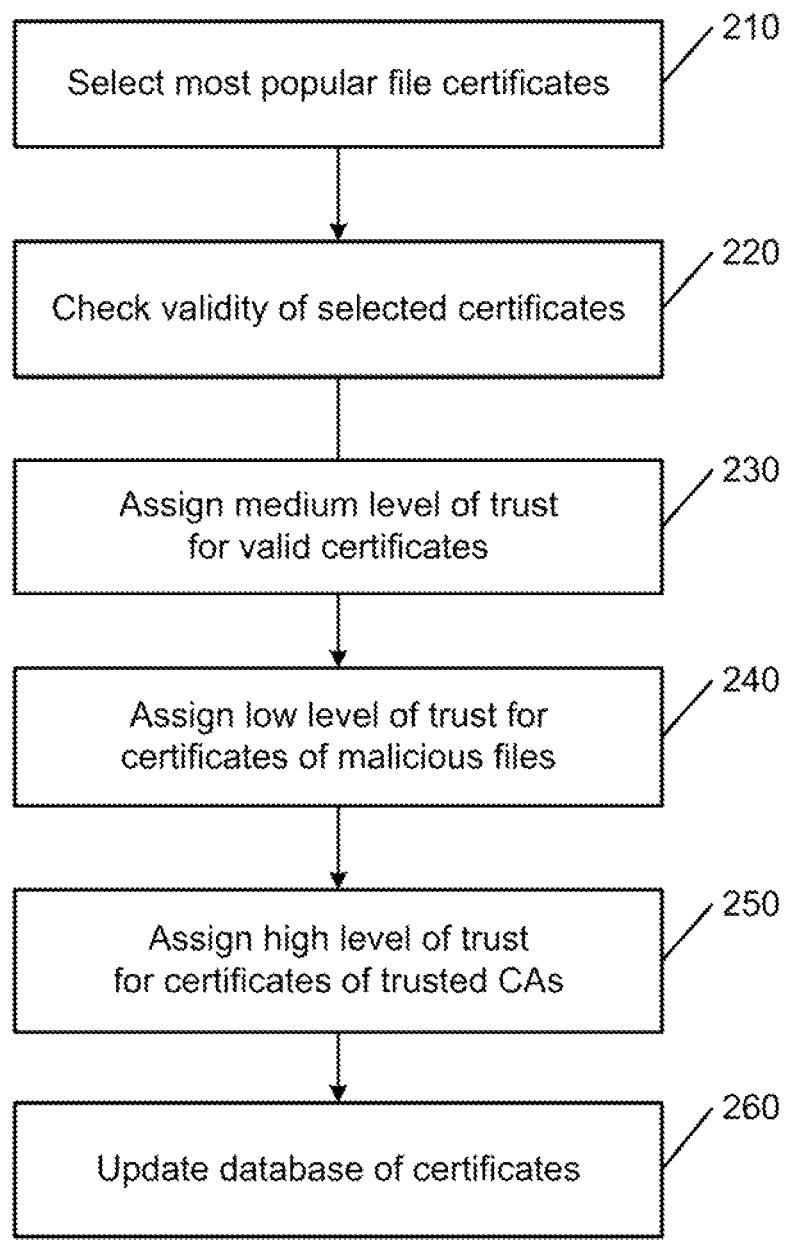
FIG. 2 shows an example method of populating the database of trusted certificates according to one example aspect.

FIG. 2 shows an example method of populating the database of trusted certificates according to one example aspect. When an unknown file 102 is executed on the computer 110, the application 101 may send an identifier of the certificate and the file (e.g., the hash sum of the file) to the server 120 for validation. Since the application 101 may be installed on a group of computers of different users, the server 120 may receive identifiers of certificates for many unknown files 102 from user computers 110. The verification module 103 may use the received identifiers to verify using the database 105 validity of the associated certificates. If a certificate for the received identifier was not found in the database 105, the verification module 103 can request the unknown file 102 from the application 101. Alternatively, the verification module 103 can obtain the unknown file 102 directly from the software producer.

In one example aspect, the verification module 103 may periodically (e.g., once a day) arranges the certificates in terms of the number of users from which the identifier of the corresponding certificate was obtained. In step 210, the verification module 103 may select from the arranged list of certificates a certain number of the most popular certificates for example, the first ten certificates). In another example aspect, the verification module 103 may check all the certificates whose identifiers have been received from users.

In step 220, the verification module 103 may check validity of the selected certificates. A certificate may be found valid when one or more of the following conditions is met:
the digital signature of the certification authority is correct;
the validity period of the certificate has not expired at the present moment;
the certificate has not been revoked.

Furthermore, a certificate may be found invalid for the following reasons:
the validity period has expired for one of the certificates in the certificate chain;
the validity periods of the certificates in the certificate chain might not overlap;
the certificate chain is circular (i.e., one of the certificates of the certificate chain was issued by a CA that was certified by the CA of the certificate being checked).

It should be noted that the checking of the validity of the certificate is not limited to the above given conditions, but can also include other conditions, such as those identified in ITU-T standard for a public key infrastructure (PKI) X.509.

In one example aspect, the checking of the digital signature can be done by system resources (e.g., in Windows OS by the Sign Tool program). In one example aspect, the checking of the digital signature can be done by deciphering it with the public key contained in the public key certificate of the given digital signature and then comparing the resulting value of the hash function of the file with the calculated value of the hash function of the file.

In one example aspect, in step 230, the module of assigning the level of trust 104 may assign different levels of trust to the certificates of unknown files received from user computers 110. For example, a medium level of trust may be assigned to valid certificates whose identifiers have been received from the users. In step 240, a low level of trust may be assigned to the remaining invalid certificates whose identifiers have been received from the users. For example, a low level of trust may be assigned to certificates of the digital signature used to sign malicious files. A list of malicious files and their certificates may be obtained from the database of malicious files 106. In step 250, a high level of trust may be assigned to certificates whose certification authority is contained on the list of trusted certification authorities. In one example aspect, the trusted certification authorities can be the CAs of the largest software producers. In another example aspect, the list of trusted certification authorities can be previously drawn up by the server 120.

In one example aspect, in step 240, a low level of trust can be assigned to intermediate certificates which are found in the certificate chains in a certain set of malicious files. For example, if an intermediate certificate was present in ten certificate chains, whereby six files signed by the end certificates of these chains were malicious, a low level of trust will be assigned to this particular intermediate certificate. At the same time, if it turns out that there were two malicious files, for example, the intermediate certificate may be assigned a medium level of trust, since there is insufficient basis to suppose that the intermediate certificate has been discredited.

As a result, in step 260, the module of assigning the level of trust 104 adds to (if the database 105 was only just created and is therefore empty) or updates the database 105 with the certificates of the obtained files 102 and their corresponding levels of trust.

Figure 3:
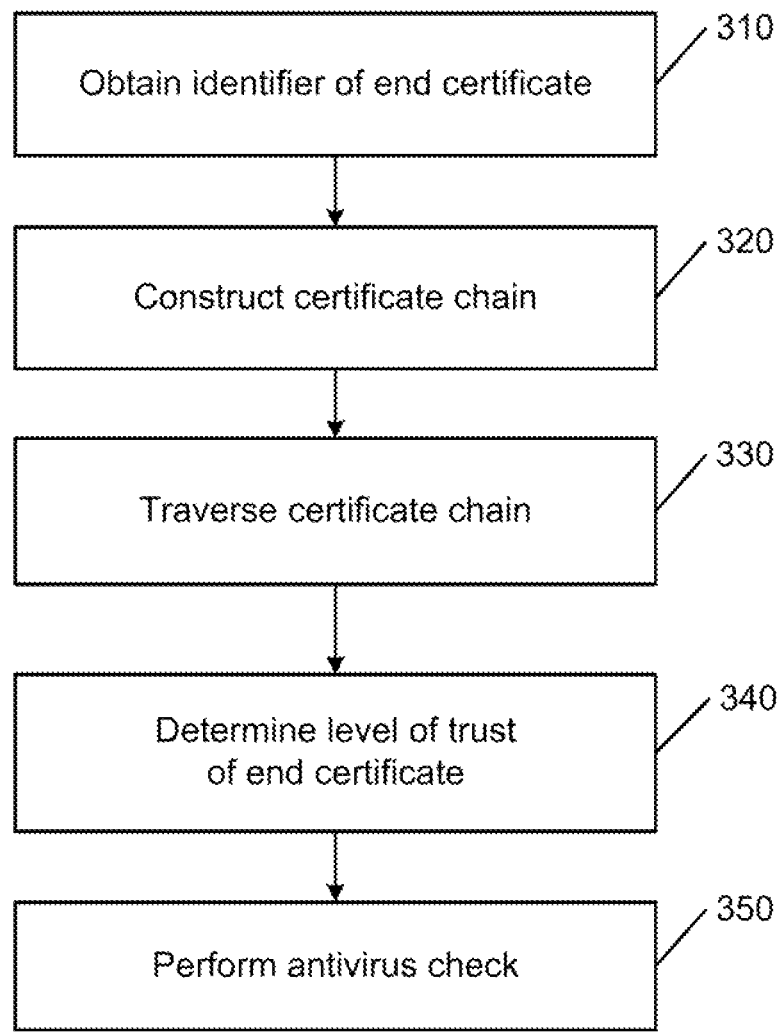
FIG. 3 shows an example method of antivirus checking of a file based on the level of trust of its digital certificate according to one example aspect.

FIG. 3 shows an example method of antivirus checking of a file using information about the level of trust of its digital certificate according to one example aspect. In the first step 310, the verification module 103 receives the identifier of the end certificate of the public key of the digital signature of a file which is being checked by the application 101. Next, in step 320, the verification module 103 constructs the certificate chain from the end certificate to the root certificate. Using the database 105, the certificate can be uniquely defined from its identifier. The construction of the certificate chain is done using method known to those of ordinary skill in the art of computer security. For example, for the end certificate, the first CA which issued the certificate is determined. For the certificate of the first CA, the second CA having issued the certificate of the first CA is determined, and so on, until the root CA is determined.

In step 330, the verification module 103 successively traverses the certificate chain, performing in succession a search for each certificate of the chain in the database 105. The level of trust of the end certificate will be renewed according to the result of validation of all certificates in the chain. The method of traversing and validating the certificate chain will be discussed in a great detail herein below with reference to FIG. 4.

As a result, in step 340 the level of trust for the end certificate is determined using the database 105. Finally, in step 350, the application 101 on the computer 110 determines whether to perform an antivirus check for the file 102 and what method of antivirus check to perform based on the level of trust of the end certificate of the file 102. This dependency is dictated by the rules of verification, which will be described herein below in Table 1. In one example aspect, the method of antivirus checking may depend on the content of the fields of the digital certificate, such as; validity period, certificate-issuing country, etc.

Figure 4:
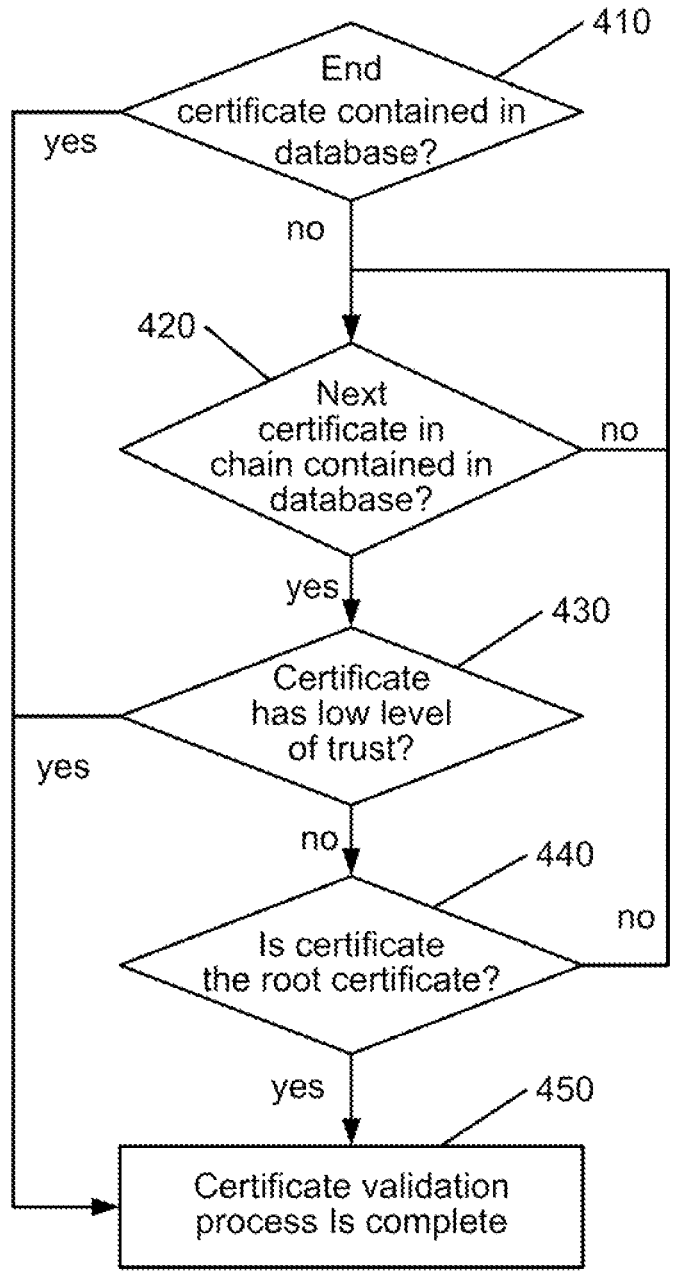
FIG. 4 shows an example method of traversing and validating the certificate chain according to one example aspect.

FIG. 4 shows an example method of traversing and validating the certificate chain according to one example aspect. The checking of the certificates may be done sequentially, starting from the end certificate and finishing with the root certificate. In step 410, a check is made as to whether the end certificate is contained in the database 105. If the certificate is found in the database 105, no further traversing of the certificate chain is required. Otherwise, in step 420, the traversing of the certificate chain is continued starting from the next certificate in the chain and until it is determined, in step 430, that the particular intermediate certificate is contained in the database 105 with a low level of trust (step 430), or until the root certificate is reached (steps 440). If an intermediate certificate is contained in the database 105 with a high or medium level of trust, the traversal the chain will continue.

If an intermediate certificate is contained in the database 105 and it has a low level of trust, the end certificate will likewise be assigned a low level of trust. This step lets one determine a malicious file when one of the intermediate certificates of the certificate chain has a low level of trust, even if for some reason (for example, the intermediate certificate was revoked due to compromising of the CA, while the parent CAs have not been compromised) the other certificates of the certificate chain have a medium or high level of trust.

If the root certificate has been reached and at least one of the intermediate certificates is contained in the database 105 with a medium or high level of trust, the end certificate of the file may be assigned a medium level of trust according to one example aspect.

Furthermore, in step 440, a check may be made to determine whether intermediate certificates with a high level of trust were present in the certificate chain. If so, the end certificate will also be assigned a high level of trust.

The last possible result of traversing and validating the certificate chain is: none of the certificates of the chain is contained in the database 105. In this case, the end certificate may be assigned a low level of trust. Moreover, in one example aspect, the identifier of the end certificate may be sent to the verification module 103, which will analyze the certificate in accordance with the method presented in FIG. 2. In another example aspect, the identifier of the file (such as the hash sum) can also be send to the verification module 103.

An example of the rules of verification for an antivirus check after completing the traversal of the certificate chain is presented in table 1 below.

TABLE 1

| No | Level of trust of end certificate | Rule |
|---|---|---|
| 1 | High | File is deemed trusted, no further antivirus check not needed |
| 2 | Medium | Additional antivirus check needed |
| 3 | Low | More thorough additional antivirus check of the file needed (automated or manual) |

For example, according to the first rule if a certificate has been found by the method presented in FIG. 4 which is an end certificate with a high level of trust, the file is deemed legitimate and no further antivirus check may be necessary. But according to the second rule, a further antivirus check will be performed. Such a check might be, for example, heuristic analysis, the use of cloud services, emulation, or other complex, resource-intensive methods.

According to the third rule of table 1, an additional antivirus check will be performed if the file was not digitally signed or the digital signature is incorrect. In this case, the most careful antivirus check or a complex of checks able to find malicious files with greater probability will be performed. For example, more resource-intensive heuristic analysis, behavioral algorithms, etc. may be used. In one example aspect, if the certificate has a low level of trust, the application 101 may block execution of the corresponding file.

Figure 5:
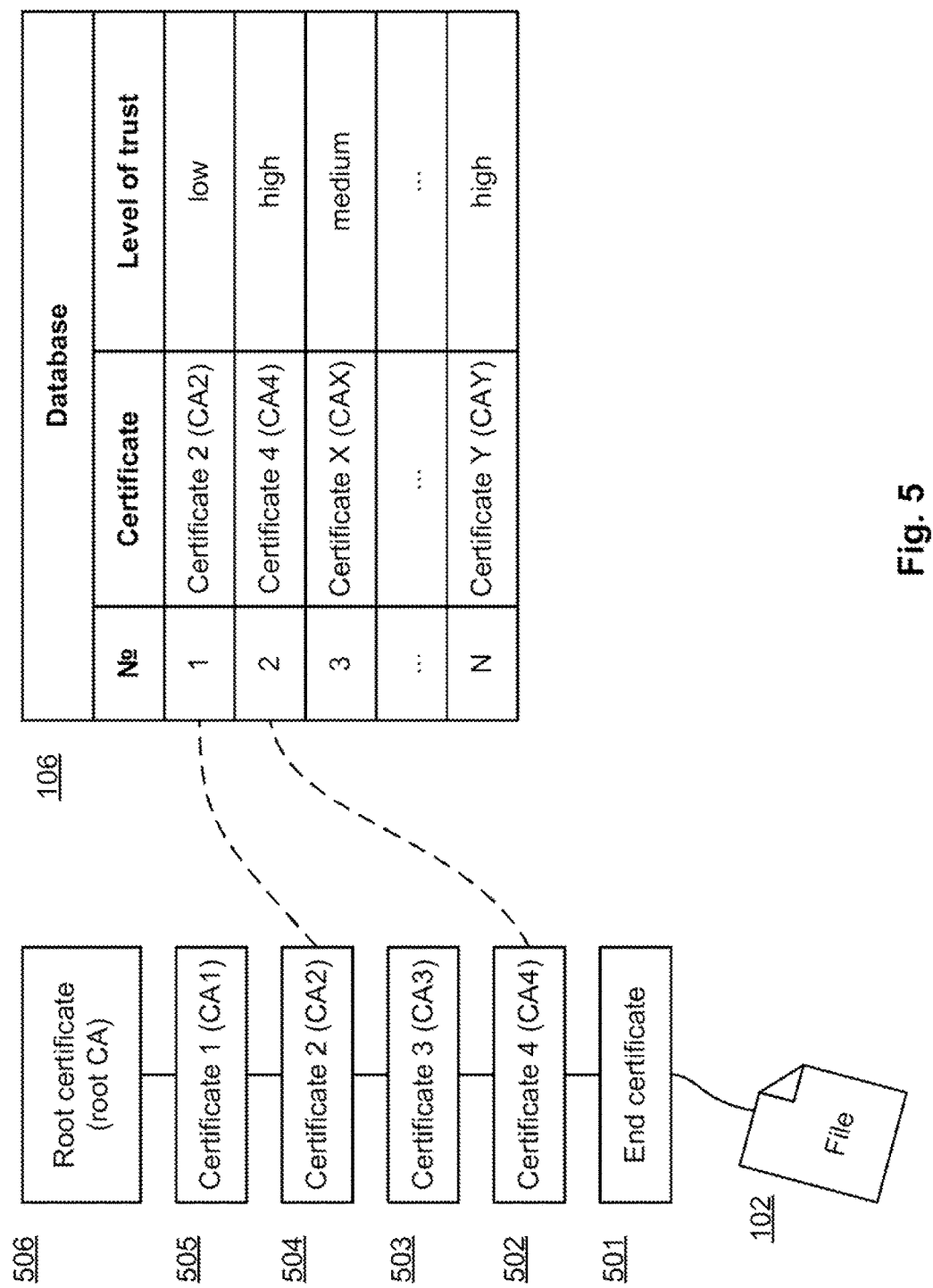
FIG. 5 shows an example diagram of traversing and validating the certificate chain according to one example aspect.

FIG. 5 shows one example of traversing and validating a certificate chain according to the method presented in FIG. 4. In this example, a file has been signed by the end certificate 501. The certificate chain consists of certificates 501-506. That is, the end certificate 501 was signed by the CA 4, whose certificate 502 was signed by CA 3, and so on.

The verification module 103, in step 410, sequentially traverses the certificates of the certificate chain, starting with the root certificate. The first certificate which is present in the database 105 is certificate 502, which has a high level of trust according to the database 105. Since it is not the root certificate, according to the method presented in FIG. 4 the traversing of the certificate chain will continue (step 440). The certificate 503 is not contained in the database 105. The next certificate 504 is contained in the database with a low level of trust. Even though two unchecked certificates still remain in the certificate chain, there is no need to continue traversing the certificate chain (step 450), since a discredited intermediate certificate 504 has been found. According to rule 3 of table 1, the most thorough additional antivirus checking of the file should be performed.

Figure 6:
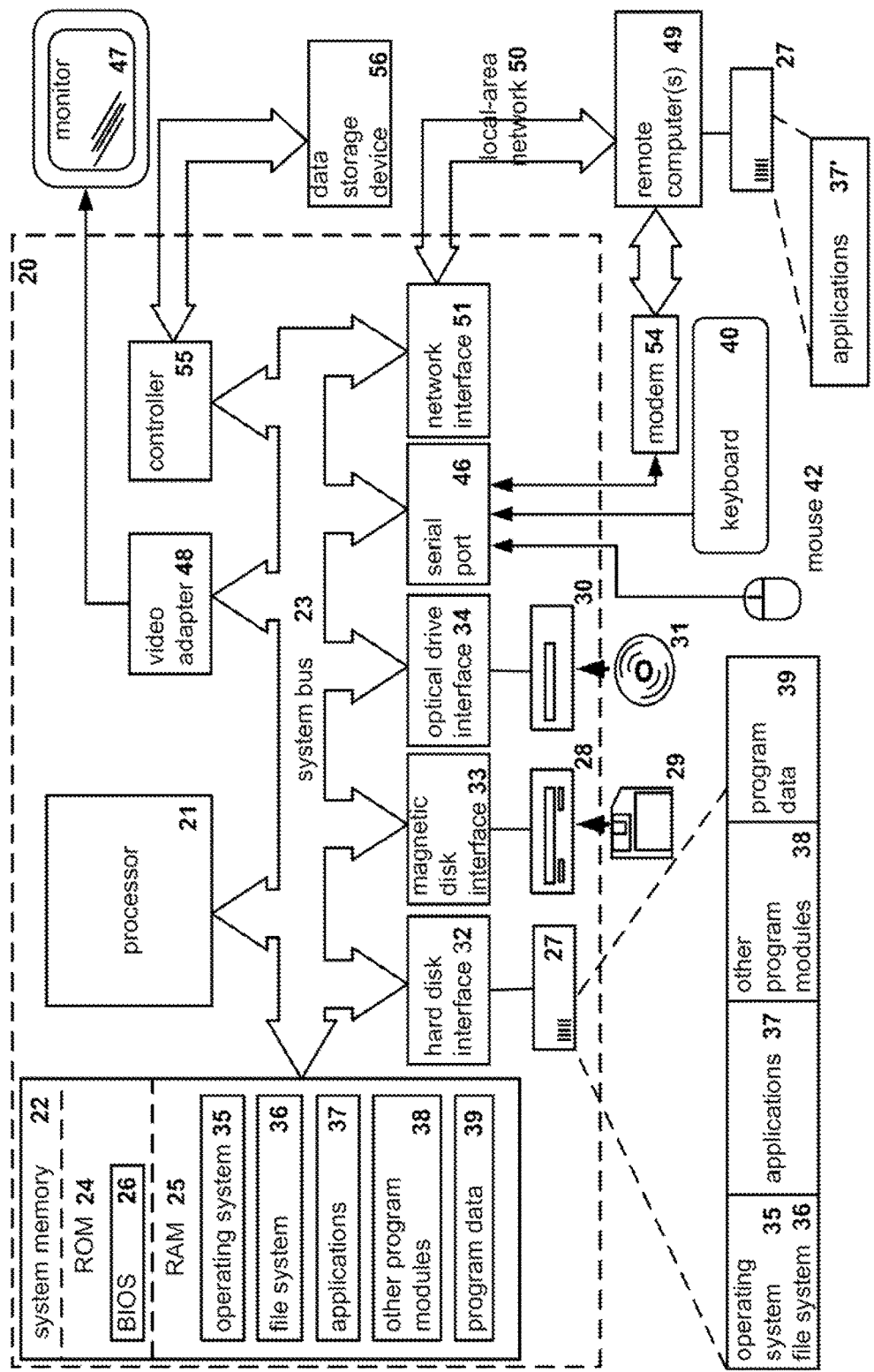
FIG. 6 shows an example of a general-purposes computer system, such as a personal computer or a server, suitable for implementing the disclosed aspects of systems and method for antivirus checking of files based on level of trust of their digital certificates according to one aspect.

FIG. 6 shows an example of a general-purpose computer system (which may be a personal computer or a server) 20, which may be used to implement system and methods for antivirus checking of files based on level of trust of their digital certificates disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing antivirus checking of a file, the method comprising:
   obtaining a digital certificate of the file, wherein the digital certificate is an end certificate associated with a certificate chain;
   determining, by a hardware processor, validity of the obtained digital certificate by decrypting a digital signature of the obtained digital certificate using a public key of an intermediate certificate authority, calculating a hash value of the digital certificate, and determining a match of the decrypted digital signature with the calculated hash value;
   assigning a level of trust to the digital certificate based on the determined validity or invalidity of the digital certificate of the file and further based on a set of intermediate digital certificates in the certificate chain,
   wherein a low level of trust is assigned to the end certificate based on a determination that at least one intermediate digital certificate of the set of intermediate digital certificates is a digital certificate used to sign a known malicious file,
   wherein a medium level of trust is assigned to the end certificate based on a determination that at least one intermediate digital certificate of the set of intermediate digital certificates is a valid digital certificate, and wherein a high level of trust is assigned to the end certificate based on a determination that at least one intermediate digital certificate of the set of intermediate digital certificates being issued by a trusted certification authority; and performing an antivirus checking method on the file based on the assigned level of trust of the digital certificate of the file, wherein one or more of heuristic analysis, emulation, and blocking execution is performed on the file having a digital certificate with an assigned low level of trust.

2. The method of claim 1, further comprising:

assigning, to at least one digital certificate in the set of intermediate digital certificates in the certificate chain, a low level of trust based on invalidity of the at least one digital certificate or based on the at least one digital certificate being used to sign a known malicious file.

3. The method of claim 1, further comprising:

assigning, to at least one digital certificate in the set of intermediate digital certificates in the certificate chain, a medium level of trust based on a validity of the at least one digital certificate; and performing signature matching of the file having a digital certificate with a medium level of trust.

4. The method of claim 1, further comprising:

assigning, to at least one digital certificate in the set of intermediate digital certificates in the certificate chain, a high level of trust based on digital certificates issued by a trusted certification authority; and not performing antivirus checking of a file having a digital certificate with a high level of trust.

5. The method of claim 1, wherein determining validity of the digital certificate includes:

constructing the certificate chain associated with the certificate of the file; and traversing the certificate chain and validating each certificate in the chain.

6. The method of claim 1, further comprising:

assigning a low level of trust to the end certificate based on an intermediate certificate in the certificate chain that were found in certificate chains of a malicious file even if other certificates in the certificate chain have an assigned medium or high level of trust.

7. The method of claim 1, wherein determining whether a digital certificate is valid when one or more of the following conditions is met:

a digital signature of a certification authority associated with the digital certificate is correct;

a validity period of the certificate has not expired at a present moment; and the certificate has not been revoked.

8. A system for performing antivirus checking of a file, the system comprising:

a hardware processor configured to:

obtain a digital certificate of the file, wherein the digital certificate is an end certificate associated with a certificate chain;

determine validity of the obtained digital certificate of the file by decrypting a digital signature of the obtained digital certificate using a public key of an intermediate certificate authority, calculating a hash value of the digital certificate, and determining a match of the decrypted digital signature with the calculated hash value;

assign a level of trust to the digital certificate based on the determined validity or invalidity of the digital certificate of the file and further based on a set of intermediate digital certificates in the certificate chain, wherein a low level of trust is assigned to the end certificate based on a determination that at least one intermediate digital certificate of the set of intermediate digital certificates is a digital certificate used to sign a known malicious file, wherein a medium level of trust is assigned to the end certificate based on a determination that at least one intermediate digital certificate of the set of intermediate digital certificates is a valid digital certificate, and wherein a high level of trust is assigned to the end certificate based on a determination that at least one intermediate digital certificate of the set of intermediate digital certificates being issued by a trusted certification authority; and perform an antivirus checking method on the file based on the assigned level of trust of the digital certificate of the file, wherein one or more of heuristic analysis, emulation, and blocking execution is performed on the file having a digital certificate with an assigned low level of trust.

9. The system of claim 8, wherein the hardware processor further configured to:

assign, to at least one digital certificate in the set of intermediate digital certificates in the certificate chain, a low level of trust based on invalidity of at least one digital certificate or based on the least one digital certificate being used to sign a known malicious file.

10. The system of claim 8, wherein the hardware processor further configured to:

assign, to at least one digital certificate in the set of intermediate digital certificates in the certificate chain, a medium level of trust based on validity of the at least one digital certificate; and perform signature matching of the file having a digital certificate with a medium level of trust.

11. The system of claim 8, wherein the hardware processor further configured to:

assign, to at least one digital certificate in the set of intermediate digital certificates in the certificate chain, a high level of trust based on digital certificates issued by a trusted certification authority; and not perform antivirus checking of a file having a digital certificate with a high level of trust.

12. The system of claim 8, wherein determining validity of the digital certificate includes:

constructing the certificate chain associated with the certificate of the file; and traversing the certificate chain and validating each certificate in the chain.

13. The system of claim 8, wherein the hardware processor further configured to:

assign a low level of trust to the end certificate based on an intermediate certificate in the certificate chain that were found in certificate chains of a malicious file even if other certificates in the certificate chain have an assigned medium or high level of trust.

14. The system of claim 8, wherein determining whether a digital certificate is valid when one or more of the following conditions is met:

a digital signature of a certification authority associated with the digital certificate is correct;

a validity period of the certificate has not expired at a present moment; and the certificate has not been revoked.

15. A computer program product, stored on a non-transitory computer readable medium, wherein the computer program product includes computer executable instructions for performing antivirus checking of a file, including instructions for:
  obtaining a digital certificate of the file, wherein the digital certificate is an end certificate associated with a certificate chain;
  determining, by a hardware processor, validity of the obtained digital certificate by decrypting a digital signature of the obtained digital certificate using a public key of an intermediate certificate authority, calculating a hash value of the digital certificate, and determining a match of the decrypted digital signature with the calculated hash value;
  assigning a level of trust to the digital certificate based on the determined validity or invalidity of the digital certificate of the file and further based on a set of with intermediate digital certificates in the certificate chain,
  wherein a low level of trust is assigned to the end certificate based on a determination that at least one intermediate digital certificate of the set of intermediate digital certificates is a digital certificate used to sign a known malicious file,
  wherein a medium level of trust is assigned to the end certificate based on a determination that at least one intermediate digital certificate of the set of intermediate digital certificates is a valid digital certificate, and
  wherein a high level of trust is assigned to the end certificate based on a determination that at least one intermediate digital certificate of the set of intermediate digital certificates being issued by a trusted certification authority; and
  performing an antivirus checking method on the file based on the assigned level of trust of the digital certificate of the file, wherein one or more of heuristic analysis, emulation, and blocking execution is performed on the file having a digital certificate with an assigned low level of trust.

16. The computer program product of claim 15, further comprising instructions for:
  assigning, to at least one digital certificate in the set of intermediate digital certificates in the certificate chain, a low level of trust based on invalidity of the at least one digital certificate or based on the at least one digital certificate being used to sign a known malicious file.

17. The computer program product of claim 15, further comprising instructions for:
  assigning, to at least one digital certificate in the set of intermediate digital certificates in the certificate chain, a medium level of trust based on a validity of the at least one digital certificate; and
  performing signature matching of the file having a digital certificate with a medium level of trust.

18. The computer program product of claim 15, further comprising instructions for:
  assigning, to at least one digital certificate in the set of intermediate digital certificates in the certificate chain, a high level of trust based on digital certificates issued by a trusted certification authority; and
  not performing antivirus checking of a file having a digital certificate with a high level of trust.

19. The computer program product of claim 15, wherein instructions for determining validity of the digital certificate include instructions for:
  constructing the certificate chain associated with the certificate of the file; and
  traversing the certificate chain and validating each certificate in the chain.

20. The computer program product of claim 15, further comprising instructions for:
  assigning a low level of trust to the end certificate based an intermediate certificate in the certificate chain that were found in certificate chains of a malicious file even if other certificates in the certificate chain have an assigned medium or high level of trust.

* * * * *